United States Patent [19]
Armbruster

[11] 3,948,106
[45] Apr. 6, 1976

[54] MOTORCYCLE WHEEL BALANCING ASSEMBLY

[76] Inventor: Joseph M. Armbruster, P.O. Box 840, Waynesville, N.C. 28786

[22] Filed: Nov. 14, 1974

[21] Appl. No.: 523,889

[52] U.S. Cl. ................................... 73/457; 254/1
[51] Int. Cl.² ............................................ G01M 1/28
[58] Field of Search ...... 73/457, 458, 466; 254/124, 254/1

[56] References Cited
UNITED STATES PATENTS

| | | | |
|---|---|---|---|
| 2,548,809 | 4/1951 | Norman | 73/457 X |
| 2,565,577 | 8/1951 | Schnoebelen | 73/457 X |

*Primary Examiner*—James J. Gill
*Attorney, Agent, or Firm*—Clarence A. O'Brien; Harvey B. Jacobson

[57] ABSTRACT

A jack structure is provided and includes an elevatable portion spaced centrally between a pair of stationary anchor points relative to which the elevatable portion may be elevated. The elevatable portion includes a lift member elevatable therewith and engageable with, to lift, undersurface portions of a motorcycle frame which passes beneath the engine of the motorcycle. With the front of the motorcycle frame elevated and the rear portion of the motorcycle frame supported by the retractable stand with which most motorcycles are equipped, the front wheel of the motorcycle is spaced above the ground and the jack structure further includes adjustable length bracing rods which may be anchored between the aforementioned anchor points and the handgrip portions of the handle bar of the motorcycle in order to firmly lock the handle bar and front fork assembly of the motorcycle against oscillation relative to the frame while the front wheel of the motorcycle is being spun during a wheel balancing operation. Also, a spring-loaded lost motion movement dampening structure is provided for operably connecting one side of the lower end of the front fork assembly of the motorcycle to a wheel balancing assembly strobe pickup unit.

13 Claims, 10 Drawing Figures

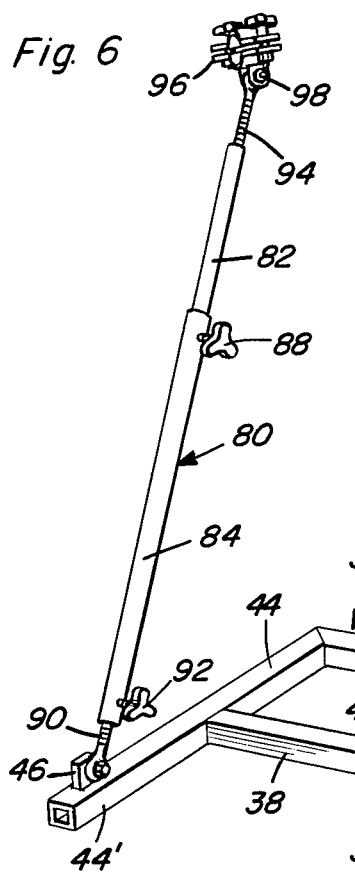
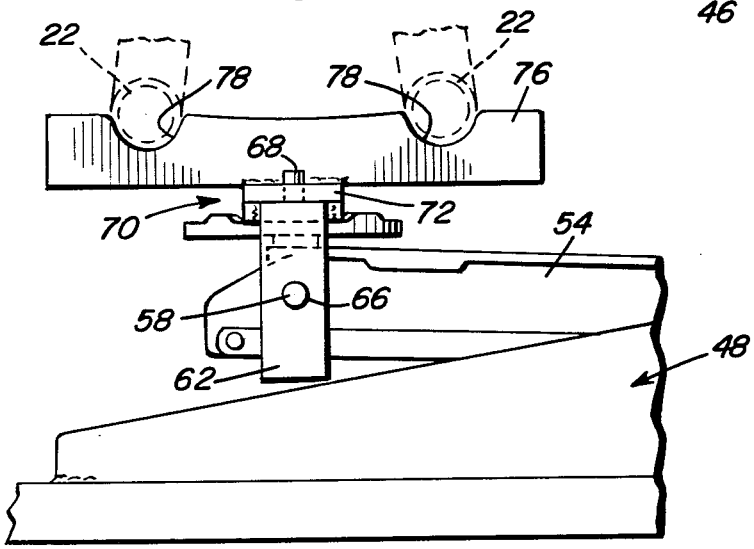
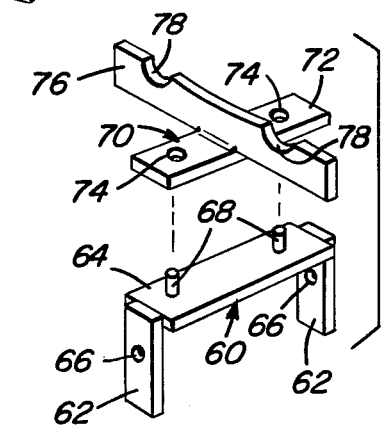
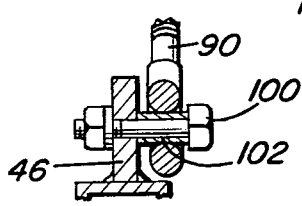
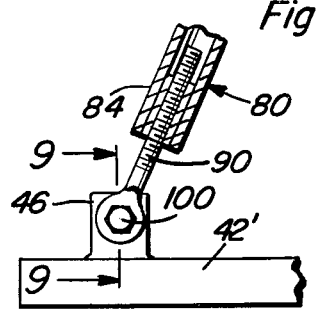

MOTORCYCLE WHEEL BALANCING ASSEMBLY

BACKGROUND OF THE INVENTION

Motorcycles are subject to annoying and possibly dangerous wheel vibrations when operated at high speeds if the wheels of the motorcycle are not dynamically balanced. In fact, an unbalanced motorcycle wheel is more noticeable to the operator of a motorcycle than an unbalanced wheel of a passenger car is noticeable to the driver of the passenger car. In addition, inasmuch as a motorcycle is supported by only one wheel at each end thereof, an unbalanced and vertically vibrating wheel of a motorcycle is more dangerous as a result of a reduction of road contact than one or two out-of-balance wheels on a passenger car.

Accordingly, in recent years there has been increased emphasis placed upon proper dynamic balancing of motorcycle wheels. however, the particular manner in which the front wheel of a motorcycle is mounted from the frame thereof poses various problems in the dynamic wheel balancing field which are not associated with passenger car wheel balancing.

The most efficient and least time-consuming manner of dynamically balancing a motorcycle wheel is for the wheel to be spun while mounted on the motorcycle. This type of wheel balancing does not pose any difficult problems when related to the balancing of the rear wheel of a motorcycle, and especially the rear wheel of a motorcycle equipped with a retractable center stand. When a motorcycle is supported on a center stand, a majority of the weight of the motorcycle is disposed forward of the stand and thus the motorcycle is supported with its rear wheel elevated above the ground. Accordingly, a motor driven wheel spinning assembly of the friction drive type may be readily engaged with the rear wheel of the motorcycle in order to spin the latter as required during a wheel balancing operation. However, when the front wheel of a motorcycle is to be spun during a wheel balancing operation some means must be provided to support the motorcycle in a stationary position with the front wheel thereof elevated above the ground. Further, inasmuch as the front wheel of a motorcycle is journaled from the lower end of a front fork assembly which is oscillatably supported from the frame of the motorcycle and rapidly spinning an unbalanced wheel on the front of a motorcycle will cause the front fork assembly to oscillate in a manner which renders a strobe pickup unit attached to the front fork assembly substantially incapable of correctly actuating the strobe light of a wheel balancer in the proper manner to enable a person to determine the proper location upon the motorcycle wheel upon which weights are to be added, a need exists not only for a means to support a motorcycle with its front wheel in an elevated position, but also for a means to securely lock the front fork assembly of the motorcycle against oscillation during the process of spin balancing the front wheel of the motorcycle.

Various types of jack assemblies including braces for bracing a portion of a vehicle to be elevated, vibration indicator and pickup units, and motorcycle and other vehicle jack constructions have been heretofore designed. However, these previous devices have not been specifically designed for use in spin balancing the front wheel of a motorcycle.

Examples of previously patented jacking devices, wheel balancer pickup units and vehicle jacking assemblies which include some components which are remotely similar to the instant invention are disclosed in U.S. Pat. Nos. 2,258,905, 2,288,097, 2,548,809, 2,604,558, 3,203,230, 3,204,933, 3,767,000, 3,772,919 and 3,779,517.

BRIEF DESCRIPTION OF THE INVENTION

The motorcycle wheel balancing assembly of the instant invention includes a jack structure for elevating the forward lower portion of the frame of a motorcycle to elevate the front wheel of the motorcycle above the ground and a pair of adjustable length brace members which may be secured to the ends of the handle bar of the motorcycle to securely anchor the motorcycle handle bar and front wheel assembly against oscillation during the wheel balancing process of the front wheel of the motorcycle by the spin balancing method.

The instant invention further includes a spring-loaded lost motion movement dampening structure whereby the strobe unit pickup of a strobe-type wheel balancing assembly may be mounted from a lower portion of the front fork assembly of the motorcycle. The movement dampening structure is required to absorb the excessive vibratory movement which is often experienced by the lower portion of the front fork assembly of a motorcycle when the front wheel supported therefrom is spun at high speeds and the wheel is unbalanced.

The main object of this invention is to provide a means whereby the front wheel of a motorcycle may be quickly and efficiently balanced by the spin balancing method.

Another object of this invention, in accordance with the immediately preceding object, is to provide a jacking assembly which may be utilized in conjunction with substantially all types of motorcycles for jacking the front frame portion of a motorcycle in order to raise the front wheel of the motorcycle above the ground.

Another object of this invention, in accordance with the immediately preceding object, is to provide a means whereby the front fork assembly of a motorcycle may be securely braced against oscillation during wheel balancing operations.

Another important object of this invention is to provide a movement dampening attachment for the strobe pickup attachment of a wheel balancer whereby excessive vibration of the front wheel journal for the motorcycle will not be transmitted directly to the strobe pickup.

A final object of this invention to be specifically enumerated herein is to provide a motorcycle wheel balancing assembly in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 6 is a perspective view of the motorcycle jacking and handle bar bracing assembly of the instant invention with a portion of one of the adjustable length brace rods thereof being broken away and illustrated in vertical section;

FIG. 7 is an enlarged side elevational view of the jacking structure illustrating the manner in which the opposite side tube portions of the motorcycle frame are engaged to be lifted by the jacking structure;

FIG. 8 is an enlarged fragmentary and elevational view of the structure illustrated in FIG. 6 and illustrating the manner in which one of the adjustable length brace rods is attached to the lower frame portion thereof;

FIG. 9 is an enlarged fragmentary vertical sectional view taken substantially upon the plane indicated by the section line 9—9 of FIG. 8; and FIG. 10 is an exploded perspective view of the motorcycle frame engaging portion of the jack structure with the changeable adapter portion thereof illustrated in exploded position.

DETAILED DESCRIPTION OF THE INVENTION

Figure 1:
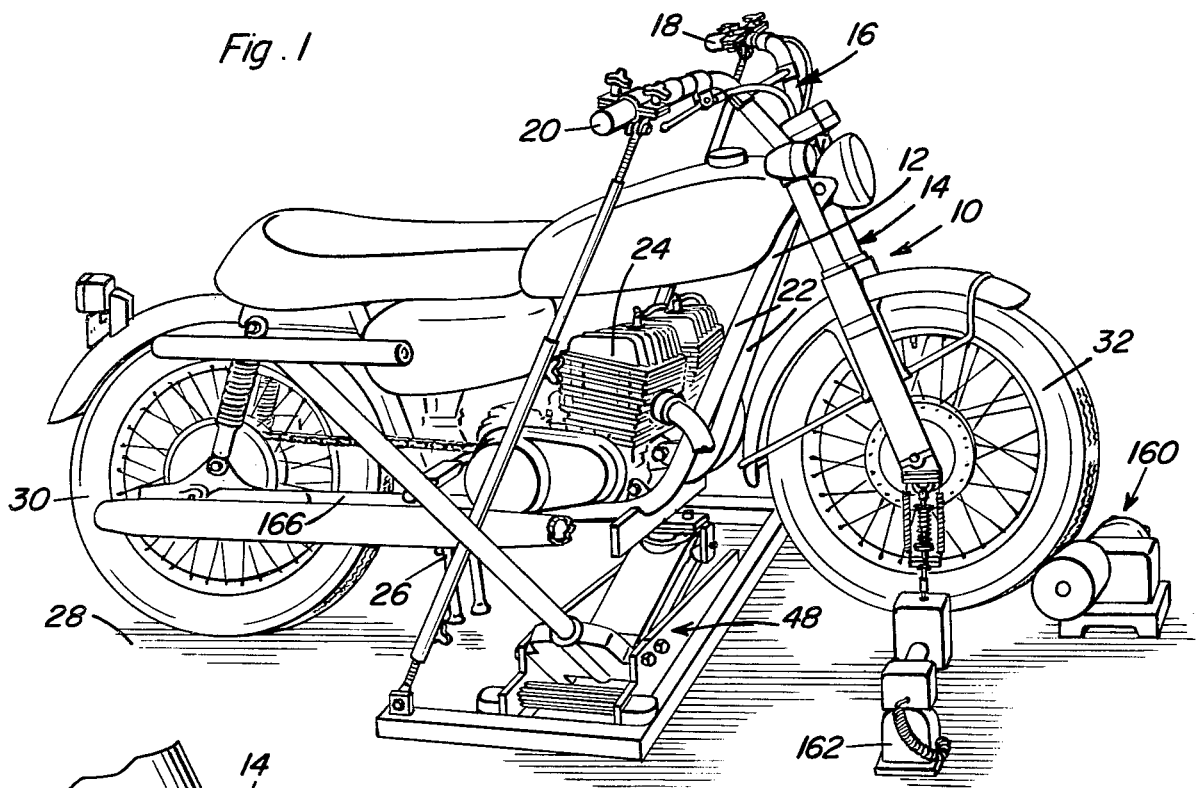
FIG. 1 is a perspective view of a conventional form of motorcycle with the wheel balancing assembly of the instant invention operatively associated therewith.
Figure 5:
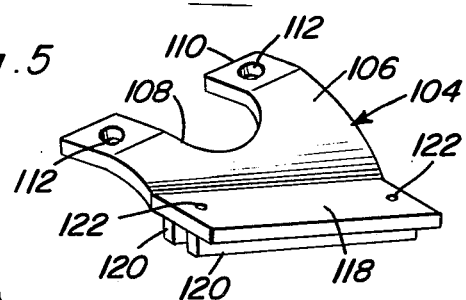
FIG. 5 is a perspective view of the attaching bracket portion of the movement dampening structure illustrated in FIGS. 2, 3 and 4.
Figure 2:
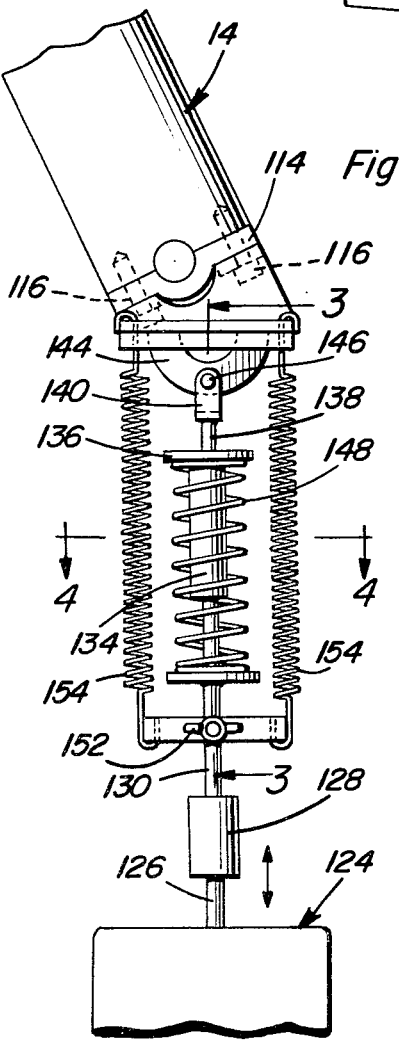
FIG. 2 is an enlarged fragmentary side elevational view of the lower portion of the near side of the front fork assembly illustrated in FIG. 1 showing in greater detail the movement dampening attachment for the strobe pickup unit and the manner of its attachment to the motorcycle front fork assembly.
Figure 3:
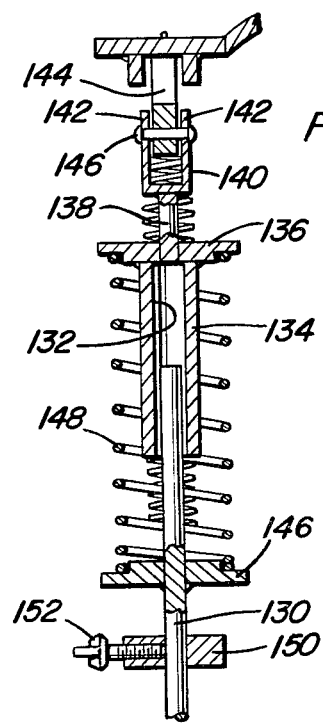
FIG. 3 is an enlarged fragmentary vertical sectional view taken substantially upon the plane indicated by the section line 3—3 of FIG. 2.
Figure 4:
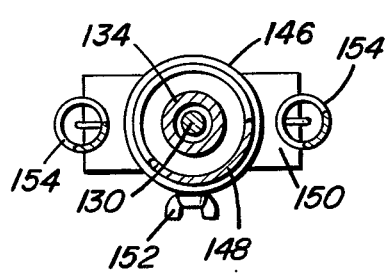
FIG. 4 is an enlarged horizontal sectional view taken substantially upon the plane indicated by the section line 4—4 of FIG. 2.

Referring now more specifically to the drawings, the numeral 10 generally designates a conventional form of motorcycle including a main frame 12 from whose forward portion a front fork assembly referred to in general by the reference numeral 14 is oscillatably supported. The upper extremity of the front fork assembly 14 includes a handle bar assembly referred to in general by the reference numeral 16 and the handle bar assembly includes opposite end handgrips 18 and 20. Further, the frame 12 includes a pair of opposite side lower forward portions 22 which extend downwardly and curve rearwardly beneath the engine 24 of the motorcycle 10. Finally, the motorcycle 10 includes a conventional pivotally attached center stand 26 spaced rearward of the center of gravity of the motorcycle 10 and by which the motorcycle 10 may be supported from the surface 28 with its rear wheel 30 elevated above the surface 28 and the front wheel 32 of the motorcycle 10 engaged with the surface 28.

The wheel balancing assembly of the instant invention includes a jacking structure referred to in general by the reference numeral 34 and including a main frame 36 which is adapted to rest upon the surface 28. The frame 36 includes a pair of longitudinal members 38 and 40 having corresponding ends thereof secured to opposite end transverse members 42 and 44. The transverse members 42 and 44 include corresponding ends defining extensions 42' and 44' which project outwardly beyond the side of the longitudinal member 38 remote from the longitudinal member 40 and the outer ends of the extensions 42' and 44' include upwardly projecting apertured mounting lugs 46.

A conventional jack structure referred to in general by the reference numeral 48 has its main frame 50 secured to the frame 36 in any convenient manner such as by welding and includes an oscillatable actuating handle 52 pivotally supported from the frame 50 as at 54. The jack or jack structure 48 further includes a lifting arm 54 which supports a lifting head 56 and the lifting arm 54 includes opposite side outwardly projecting pins 58.

The jack 48 is of the type commonly found in service stations and garages and the lifting head 56 thereof is usually engaged with an undersurface portion of a vehicle to be elevated by the jack 48. However, in order to adapt the lifting head 56 for use in lifting the frame 12 of the motorcycle 10, an inverted U-shaped mounting bracket referred to in general by the reference numeral 60 is provided and includes a pair of opposite side upstanding legs 62 interconnected at their upper ends by means of a horizontal bight portion 64. The legs 62 are provided with apertures or bores 66 which receive the pins 58 therethrough and the undersurface of the bight portion 54 rests upon and extends across the upper surface of the lifting head 56. The bight portion 64 includes a pair of upwardly projecting mounting pins 68 and an adapter attachment referred to in general by the reference numeral 70 includes a main horizontal bar 72 having opposite end apertures 74. The bar 72 is positionable on the upper surface of the bight portion 64 with the mounting pin 68 snugly received through the apertures 74. Further, the bar 72 includes an edge upstanding crossbar 76 having a pair of upwardly opening notches 78 formed in its opposite end portions.

With the jacking structure 48 extending transversely beneath the engine 24 of the motorcycle 10, the jack 48 is actuated to raise the lifting head 56 and the adapter attachment 70 supported therefrom. The notches 78 receive the under portions of the lower frame portions 22 beneath the forward portion of the engine 24 and the jack structure 48 may thus be utilized to elevate the forward portion of the frame 12 so as to rock the motorcycle in a counterclockwise direction as viewed in FIG. 1 of the drawings to a position with the motorcycle supported from the stand 26 and the rear wheel of the motorcycle 30 engaged with the surface 28 while the front wheel 32 of the motorcycle 10 is elevated above the surface 28.

A pair of adjustable length bracing rods 80 are provided and each rod 80 includes a pair of relatively telescoped upper and lower tubular sections 82 and 84. Each section 84 includes a thumbscrew 88 operatively associated with the end thereof into which the corresponding upper section 82 is telescoped and the thumbscrews 88 may be utilized to retain the rods 80 in adjusted extended positions. Further, the lower ends of the sections 84 have threaded eye members 90 threaded thereinto and the lower ends of the sections 84 include setscrews 92 for releasably retaining the corresponding eye members in adjusted position. Further, additional eye members 94 are threaded into the upper ends of the upper sections 82 and the eye members 94 support releasable clamp assemblies 96 therefrom by means of pivot fasteners 98. Also, the lower eye members 90 are pivotally attached to the mounting flanges 46 by means of pivot fasteners 100 equipped with bearing sleeves 102 and secured through the eye members 90 and the flanges 46.

After the motorcycle 10 has been positioned as illustrated in FIG. 10 by means of the jack 48, the bracing rods 80 are adjusted in length and the releasable clamp assemblies 96 thereof are tightly clamped to the handgrips 18 and 20. In this manner, the front fork assembly 14 of the motorcycle 10 is securely braced against oscillation relative to the frame 12.

Inasmuch as the eye members 90 are supported from the flanges 46 by means of the fasteners 100 and bearing sleeves 102, the eye members 90 may not only pivot about the fasteners 100 but may also be at least slightly inclined relative thereto. In this manner, the lower ends of the bracing rods 80 may not only be angularly adjusted about the pivot fasteners 100 but also at least slightly angularly adjusted about axes transverse to the fasteners 100.

With attention now invited more specifically to FIGS. 2, 3, 4 and 5, a mounting bracket is generally referred to by the reference numeral 104 and includes a curved flange portion 106 having an outwardly opening notch 108 formed in one edge portion 110 thereof centrally intermediate its opposite ends. The opposite ends of the edge portion 110 are provided with apertures 112 and the edge portion 110 of the flange 106 is thus mountable beneath the end cap 114 on one side of the lower end of the front fork assembly 14 by means of the end cap attaching bolts 116.

The mounting bracket 104 further includes an angulated planar flange portion 118 remote from the edge portion 110 and the underside of the flange portion 118 includes a pair of parallel depending positioning flanges 120. Further, the opposite ends of the flange portion 118 are apertured as at 122 between the positioning flanges 120.

A conventional strobe pickup unit referred to in general by the reference numeral 124 is provided and includes the usual vertically reciprocal rod 126. The unit 124 may be considered as equivalent to the strobe pickup unit of a Stewart Wa...er wheel balancing assembly such as the model No. 7057-2 Model.

The upper end of the rod 126 has a coupler 128 supported therefrom and the lower end of a second rod 130 is releasably secured in the coupler 128 for movement with the rod 126. The upper end of the rod 130 is freely reciprocal in a downwardly opening blind bore 132 formed in a sleeve 134 closed at its upper end by means of a closure disc 136 secured thereacross and a support rod 138 is rigidly supported from the disc 136 and projects upwardly from the center thereof and is anchored at its upper end to an upwardly opening U-shaped yoke 140 between whose legs 142 and mid-portion of a U-shaped permanent magnet 144 is pivotally supported by means of a pivot fastener 146. The ends of the U-shaped permanent magnet 144 are receivable between the positioning flanges 120 carried by the flange portion 118 slightly inwardly of the apertures 122 formed in the opposite ends of the flange portion 118.

The rod 130 has an abutment disc 146 secured thereto a spaced distance below the lower end of the sleeve 134 and a compression spring 148 is disposed about the sleeve 134 and the upper end of the rod 130 and has its opposite ends abutted against the confronting surfaces of the discs 136 and 146. Further, the rod 130 has a setscrew equipped anchor member 150 mounted thereon for adjustable positioning therealong and the setscrew 152 of the anchor member 150 may be utilized to releasably secure the anchor member 150 in adjusted position along the rod 130. The opposite ends of the anchor member 150 have the lower ends of a pair of coiled tension springs 154 removably anchored thereto and the upper ends of the tension springs 154 are removably anchored to the opposite ends of the flange portion 118 by means of the apertures 122.

After the motorcycle 10 has been positioned as illustrated in FIG. 1 of the drawings, and the adjustable length rods 80 have been securely anchored to the handgrips 18 and 20, the mounting bracket 104 is attached over the end cap 114 by means of the fasteners 116. Then, after the magnet 144 has been engaged with the flange portion 118 and the upper ends of the tension springs 154 have been engaged with the opposite ends of the flange portion 118, the motorized unit referred to in general by the reference numeral 160 may be utilized to rapidly spin the front wheel 32 of the motorcycle 10. Then, the strobe unit 162 which is actuated by vertical reciprocation of the rod 126 is utilized to determine that point on the periphery of the rim of the front wheel upon which balancing weights are to be attached. The manner of using a strobe wheel balancing unit is well known in the wheel balancing art and accordingly, no further explanation of its operation is deemed necessary. However, the lost motion connection between the support rod 138 for the magnet 144 and the rod 130 through the springs 148 and 154 serves to dampen excessive vibratory movement of the front fork assembly 14 when the front wheel 32 is being spun at high speeds and to enable the strobe light 162 to be actuated accurately in order that a person operating the strobe light 162 may readily determine the correct position on the periphery of the rim to which balancing weights are to be attached by means of the spokes or directly to the rim itself.

When the rear wheel 30 of the motorcycle 10 is to be spin balanced, the motorcycle 10 is merely supported on the surface 28 by its stand 26 and the unit 160 may be utilized to spin the wheel 30, the magnet 144 being readily attachable to the swing arm 166 of the motorcycle 10 from which the rear wheel 30 is journaled.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a base over which the mid-portion of a motorcycle may be positioned, said base including horizontally spaced apart anchor points and elevatable jack means generally centrally intermediate said anchor points and upwardly movable relative to said base to engage and lift the forward lower frame members of a motorcycle disposed thereabove, and a pair of upstanding elongated adjustable length bracing rods having their lower ends anchored to said anchor points for at least limited universal angular displacement of said rods relative to said base, the upper ends of said rods including anchor means for releasable rigid anchoring to the end portions of the handle bar of said motorcycle.

2. The combination of claim 1 wherein said jack means includes an adapter removably supported therefrom defining a pair of upwardly opening horizontal recesses paralleling each other and extending along generally horizontal paths generally normal to a line extending between said anchor points.

3. The combination of claim 1 wherein said anchor means comprise clamp assemblies for removably clampingly engaging said handle bar end portions.

4. The combination of claim 3 wherein said clamp assemblies are pivotally anchored to the upper ends of said bracing rods.

5. The combination of claim 4 wherein each of said bracing rods includes upper and lower end portions relatively rotatable and telescopingly engaged with each other and means for releasably retaining said end portions in adjusted rotated and telescoped positions.

6. The method of preparing the front wheel assembly of a motorcycle of the type supported by a center retractable stand for balancing, said method comprising the steps of upwardly jacking a portion of the frame of the motorcycle spaced forward of the stand until the rear wheel of the motorcycle is lowered into contact with the ground and the front wheel of the motorcycle is elevated above the ground, and attaching the upper ends of upstanding bracing members to the end portions of the handle bar of the motorcycle and anchoring the lower ends of the bracing members relative to the ground on opposite sides of the motorcycle in a manner to securely brace the handle bar and front fork assembly of the motorcycle against oscillation relative to the motorcycle frame.

7. The method of claim 6 including the step of attaching the vertically reciprocal strobe pickup rod of a strobe light actuating assembly to a lower portion of one side of the motorcycle front fork assembly by means of an upstanding motion transmitting structure having its upper end supported from the front fork assembly lower portion and its lower end anchored to the pickup rod, said motion transmitting structure including opposite end portions extendable and retractable relative to each other and spring-biased, by opposing and balanced expansion and compression springs, toward predetermined relatively extended positions.

8. The method of claim 6 including the step of attaching the vertically reciprocal strobe pickup rod of a strobe light actuating assembly to a lower portion of one side of the motorcycle front fork assembly by means of an upstanding motion transmitting structure of a lengthwise extendable and retractable type and spring-biased, by means of opposing and balanced expansion and compression springs, toward a predetermined extended position thereof.

9. A movement dampening structure for disposition between the lower portion of one side of an elevated motorcycle front fork assembly and the vertically reciprocal pickup rod of a strobe light actuator for a wheel spin balancing assembly, said movement dampening structure comprising an upstanding motion transmitting structure including relatively extendable and retractable elongated upper and lower end portions guidingly supported from each other for lengthwise extension and retraction, means carried by the lower and upper ends of said lower and upper end portions, respectively, for releasable attachment to said pickup rod and lower front fork portion, opposing and balanced compression and expansion coil springs connected between said upper and lower end portions yieldingly resisting retraction and expansion, respectively, of lower end portion relative to said upper end portion, said expansion spring means including means for adjustably expanding the latter independent of relative extension and retraction of said end portions.

10. In combination, a base over which the mid-portion of a motorcycle may be positioned, said base including horizontally spaced apart anchor points and elevatable jack means generally centrally intermediate said anchor points and upwardly movable relative to said base to engage and lift the forward lower frame members of a motorcycle disposed thereabove, and a pair of upstanding elongated adjustable length bracing rods having their lower ends anchored to said anchor points for at least limited universal angular displacement of said rods relative to said base, the upper ends of said rods including anchor means for releasable rigid anchoring to the end portions of the handle bar of said motorcycle, a movement dampening structure for disposition between a lower portion of one side of the front fork assembly of said motorcycle and the vertically reciprocal pickup rod of a strobe light actuator for a wheel spin balancing assembly, said movement dampening structure comprising an upstanding motion transmitting structure including relatively extendable and retractable elongated upper and lower end portions guidingly supported from each other for lengthwise extension and retraction, means carried by the lower and upper ends of said lower and upper end portions, respectively, for releasable attachment to said pickup rod and lower front fork portion, and opposing and balanced compression and expansion coil springs connected between said upper and lower ends yieldingly biasing the latter toward predetermined relatively extended positions.

11. A mounting bracket for attachment of a strobe light actuator pickup rod to one side lower portion of a motorcycle front fork assembly, said bracket including an arched plate portion including a centrally notched longitudinal side edge portion, the opposite ends of said notched edge portion having mounting apertures formed therethrough, the opposite longitudinal side edge portion of said plate portion including an elongated generally planar flange extending along said opposite longitudinal side edge portion angulated slightly outwardly of the convex side of said plate portion, said planar flange including a pair of depending parallel flanges extending longitudinally therealong, said flange portion being constructed of ferrous material and the spacing between said flanges being adapted to snugly receive the free end portions of an inverted U-shaped permanent magnet therebetween.

12. In combination, a support surface upon which to support a motorcycle on its front and rear wheels, jack means stationarily supported from said support surface and upwardly movable relative to said surface to engage and lift a lower frame portion of a motorcycle at a point spaced longitudinally thereof from the center of gravity of the motorcycle and a pair of elongated upstanding bracing rods having their lower ends anchored to said surface on remote sides of said jack means and against horizontal shifting relative to said surface, the upper ends of said bracing rods including anchor means for releasable anchoring to the end portions of the handle bar assembly of the motorcycle.

13. The method of preparing the front wheel assembly of a motorcycle disposed on a support surface for spin balancing of the front wheel assembly, said method including upwardly lifting a portion of the frame of the motorcycle spaced forwardly of the center of gravity thereof so as to elevate the front wheel of the motorcycle above the support surface, attaching the upper ends of upstanding bracing members to the end portions of the handle bar assembly of the motorcycle and anchoring the lower ends of the bracing members relative to the support surface on opposite sides of the motorcycle in a manner to securely brace the handle bar assembly and front fork assembly of the motorcycle against oscillation relative to the motorcycle frame.

* * * * *